US012644317B2

(12) United States Patent
Prezelin

(10) Patent No.: US 12,644,317 B2
(45) Date of Patent: Jun. 2, 2026

(54) MODULAR HIGH CAPACITY HANGER

(71) Applicant: Louis Marie Prezelin, Santa Barbara, CA (US)

(72) Inventor: Louis Marie Prezelin, Santa Barbara, CA (US)

( * ) Notice: Subject to any disclaimer, the term of this patent is extended or adjusted under 35 U.S.C. 154(b) by 0 days.

(21) Appl. No.: 16/885,713

(22) Filed: May 28, 2020

(65) Prior Publication Data

US 2020/0392763 A1 Dec. 17, 2020

Related U.S. Application Data

(60) Provisional application No. 62/921,403, filed on Jun. 17, 2019.

(51) Int. Cl.

*A47G 25/18* (2006.01)
*A47G 25/16* (2006.01)
*A47G 25/40* (2006.01)
*E05B 69/00* (2006.01)

(52) U.S. Cl.

CPC ............ *E05B 69/006* (2013.01); *A47G 25/16* (2013.01); *A47G 25/18* (2013.01); *A47G 25/4015* (2013.01)

(58) Field of Classification Search

CPC ........ A47G 25/16; A47G 25/18; A47G 25/20; A47G 25/28; A47G 25/32; E05B 69/006
USPC .............................................. 223/91, 85, 88
See application file for complete search history.

(56) References Cited

U.S. PATENT DOCUMENTS

| | | | | |
|---|---|---|---|---|
| 2,506,510 | A * | 5/1950 | Longwell ............. | A47G 25/485 223/91 |
| 2,577,397 | A * | 12/1951 | Bailey .................... | A47G 25/18 211/118 |
| 3,261,518 | A * | 7/1966 | Everett .................. | A47G 25/16 223/91 |
| 3,307,753 | A * | 3/1967 | Levine ................... | A47G 25/16 223/95 |
| 3,963,154 | A * | 6/1976 | Schwartz ............... | A47G 25/32 223/88 |
| 4,074,838 | A * | 2/1978 | Blasnik .................. | A47G 25/32 223/85 |
| 4,765,467 | A * | 8/1988 | Kolton ................. | A47G 25/743 206/278 |
| 6,070,773 | A * | 6/2000 | Pogoda .................. | A47G 25/18 223/88 |
| 6,105,835 | A * | 8/2000 | Hatakeyama .......... | A47G 25/30 223/91 |
| 6,758,378 | B2 * | 7/2004 | Carmichael ............ | A47G 25/16 223/85 |
| 7,448,520 | B2 * | 11/2008 | Kolton .................. | A47F 5/0006 223/85 |

* cited by examiner

*Primary Examiner* — Nathan E Durham

(57) ABSTRACT

The modular high-capacity hanger was conceived to exceed the capacity and versatility of existing heavy-duty hangers. To achieve this goal, the hanger body features 3 sets of customized arms, a lower hook and four twist-on accessory hooks. The hanger swivel handle and the 4 accessory hooks are removable to reduce the size of the hanger when not in use. As a result, the modular high-capacity hanger offers an unmatched versatility and a storage capacity equivalent to multiple conventional heavy-duty hangers.

4 Claims, 6 Drawing Sheets

MODULAR HIGH CAPACITY HANGER

BACKGROUND

Field of Invention

This invention relates to heavy-duty plastic hangers designed for garments and personal gear.

Description of Prior Art

Existing heavy-duty hangers are generally bulky and offer limited functionality. Hangers designed for professional use or for sports activities such as diving are configured for specific types of garments or accessories. Currently available hangers can only accommodate a small amount of gear. It is common to need several conventional hangers to store the entire equipment of one professional user such as law enforcement and military personnel, firemen, industrial workers or sportsmen.

Existing Related Hangers:
- Firemen and industrial hangers:
  - Gear master air dry coat hanger
  - Tough hook hanger
  - Glaro aluminum hangers
  - Hangers for scuba diving gear:
    - Underwater Kinetics hangers.
    - XS Scuba hangers.

SUMMARY OF INVENTION

The objective of this invention is to overcome the storage limitations, bulkiness and lack of versatility of existing heavy-duty hangers.

The modular heavy-duty hanger body and accessories are made of injection molded glass reinforced Polyamide for maximum strength as well as UV and chemical resistance. The hanger body combines I beam sections as well as hollowed out sections designed for maximum strength and minimum weight. The hanger body features 3 sets of arms configured to hold securely a wide range of garments and accessories while keeping each item easily accessible. The hanger storage capacity is further enhanced with the addition of four removable twist-on accessory hooks which attach instantly to the hanger body. A swivel handle offers the option to hang the hanger at any angle. This handle is removable to reduce the size of the hanger when stored in a limited space.

As a result of the design and features outlined above, one single modular high-capacity hanger can match the storage capability of several existing heavy-duty hangers.

BRIEF DESCRIPTION OF DRAWINGS

The modular high-capacity hanger body and accessories consist of one hanger body. Invention is illustrated in 6 separate drawings.

DETAILED DESCRIPTION OF THE MODULAR HIGH-CAPACITY HANGER

Figure 1:
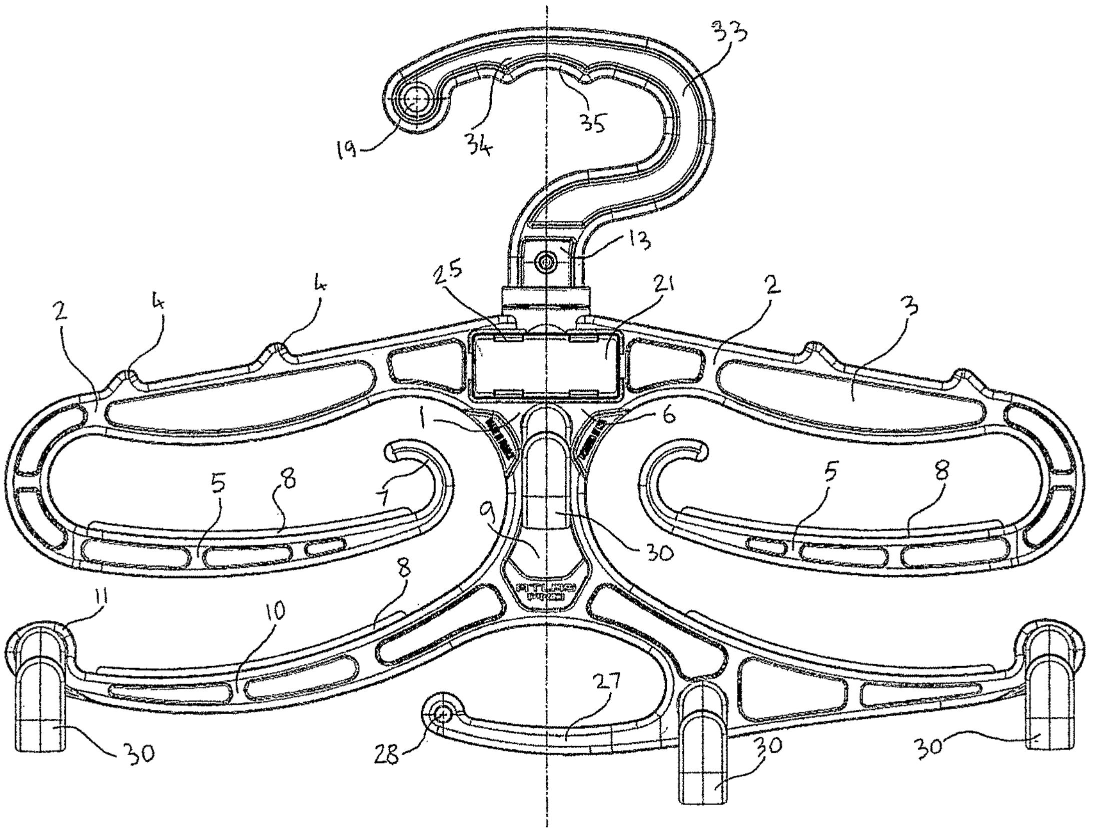
FIG. 1: Frontal view shows the assembled hanger and its accessories.
Figure 2:
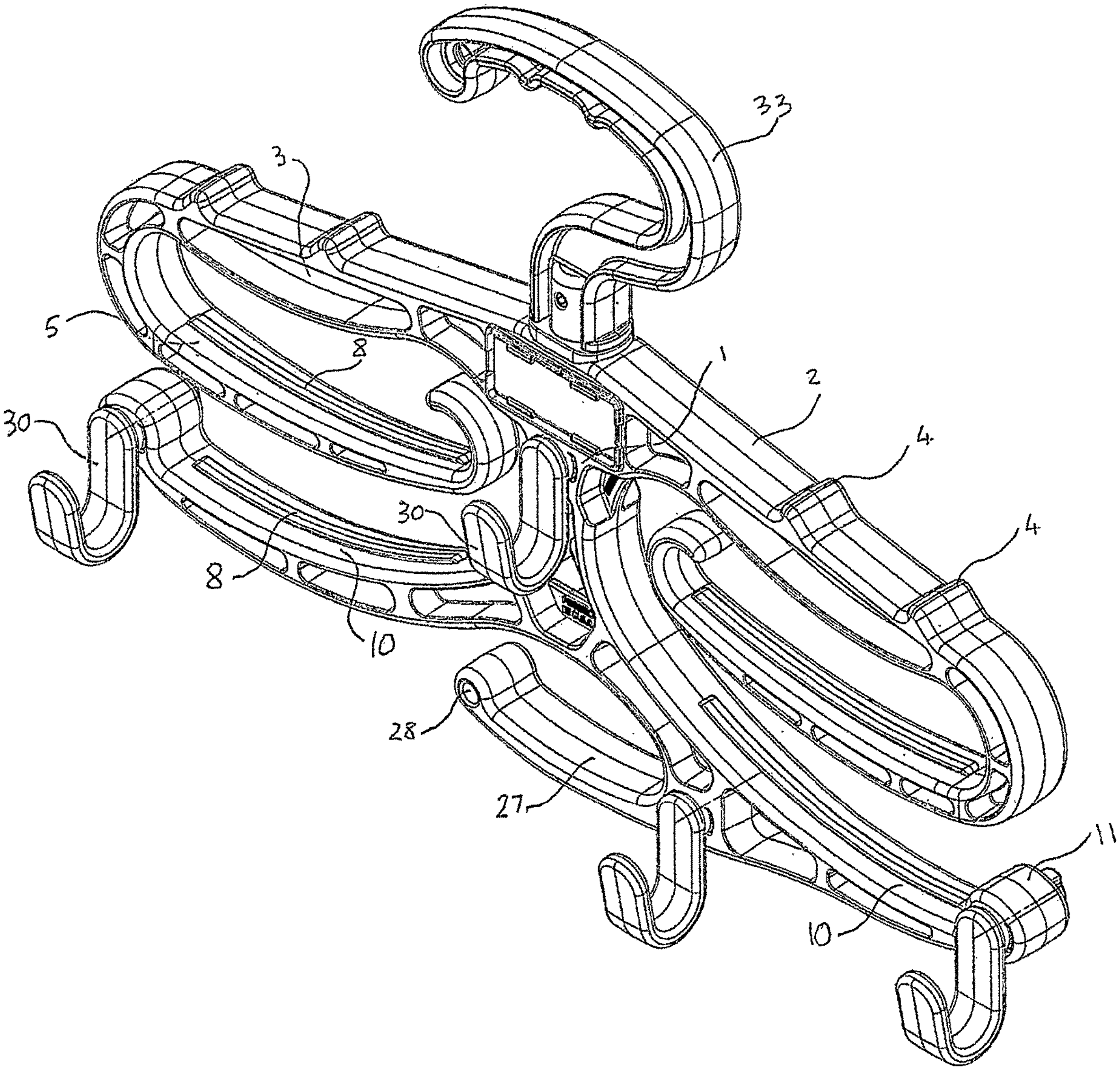
FIG. 2: Isometric view shows the assembled hanger and accessories with a perspective which facilitates visualization of parts of the body and of accessories.
Figure 3:
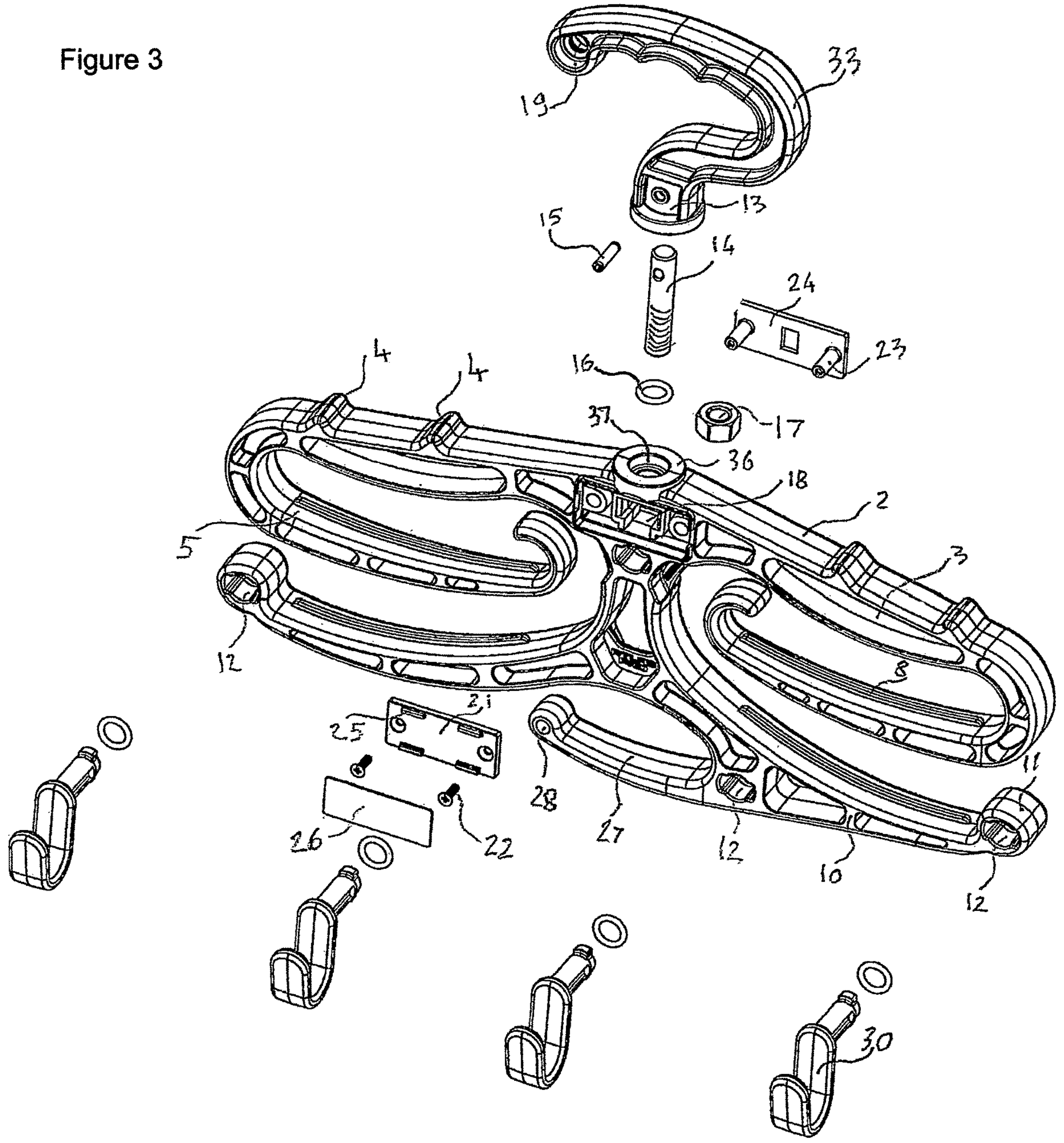
FIG. 3: Exploded view of the hanger body and accessories shows the disassembled hanger body and accessories as well as assembly components.
Figure 4:
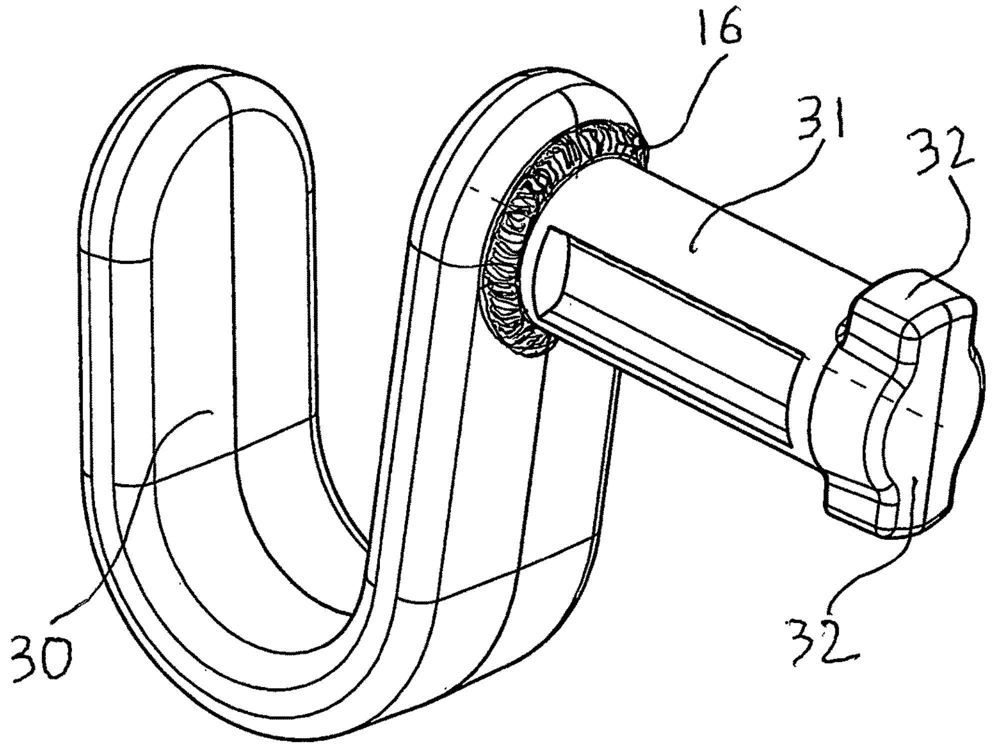
FIG. 4: Isometric view of one accessory hook with a perspective showing the shape of the vertical spurs and the position of the "soft lock" O ring.
Figure 5:
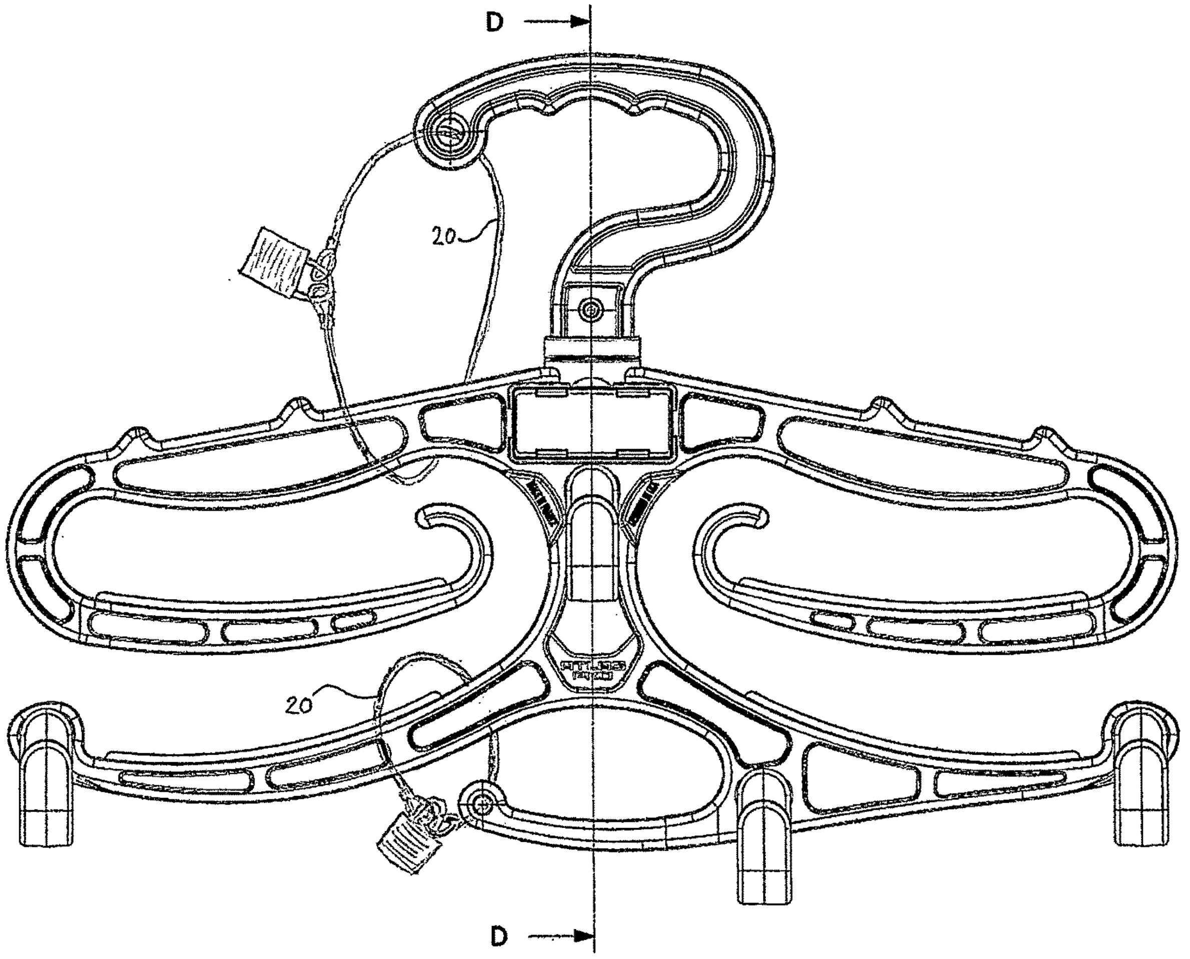
FIG. 5: Frontal view of the assembled hanger with locking cables in place.
Figure 6:
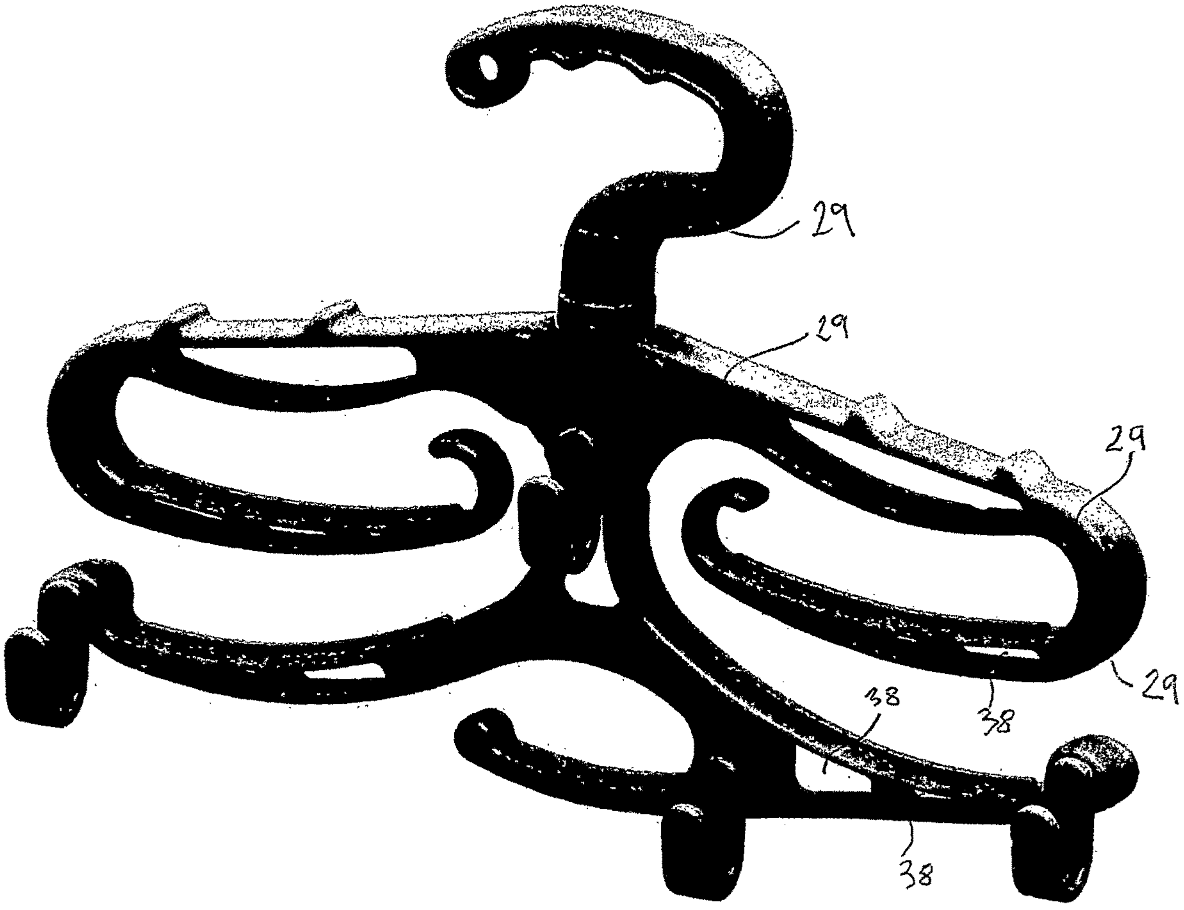
FIG. 6: Isometric view of the assembled hanger body and accessories showing I beam sections and hollowed out sections.

The objectives of this invention are to resolve most of the limitations of existing heavy-duty hangers and to greatly expand the fields of applications for this type of device.

The modular high-capacity hanger consists of a body (1) and of several removable accessories which can be screwed or locked on to the body. The body and accessories of the modular high-capacity hanger are made of injection molded Polyamide reinforced with micro glass beads for maximum strength Polyamide is resistant to UV and to most chemicals. 30% glass reinforced polyamide. This material offers high mechanical stability within temperatures from −20° C. to 120° C., as well as resistance to UV and to most chemicals.

All screws (22), the handle insert (14), the pin (15) and the hex nut (17) are made of stainless steel. The "soft lock" O, rings (16) of the handle (33) and of the accessory hooks (30) are made of neoprene or rubberized material.

The modular high-capacity hanger is 18" wide, 1" thick, and 12" high, with the handle attached. With the handle detached, the hanger is 7,25" high.

The modular high-capacity hanger body (1) is designed with a combination of I-beam profile (29) and hollowed out sections (38) positioned to provide maximize rigidity and allow some flex in predetermined sections of the arms, while minimizing the overall weight. The body (1) features three sets of arms designed to hold securely a wide range of garments and accessories while keeping each item easily accessible.

The upper center part of the modular high-capacity hanger body features a round flange (36) facing upward. A vertical hole (37) located in the center of the flange, allows for the threaded stem of the removable swivel handle (33) to be inserted and screw into the stainless-steel hex nut (17) located in the upper body hollow cavity (18). The hollow cavity (18), located beneath the flange (36) is shaped to hold the hex nut (17) tightly so that it does not rotate.

A plastic name plate (21) covers one side of the hollow cavity (18) and screws (22) into the 2 stems (23) of a logo plate (24) located on the opposite side of the hollow cavity (16). Both name plate (21) and logo plate (24) are shaped and dimensioned to fit exactly into the rectangular recess of the hollow cavity (18). The name plate (21) includes 4 retainers (25) to hold securely an optional separate plastic name tag (26) which slides on top of the name plate (21).

The modular high-capacity hanger body (1) upper section features two upper arms (2) slightly slanted downward. Each upper arm (2) includes a retaining slot (3) located on the lower side the arm. This retaining slot (3) is designed to insert small clothing items for storage or drying. Two retaining spurs (4) located on the upper side of each upper arm prevent lateral garment slippage.

The outer section of the upper arms (2) curves downward into a secondary arm (5). The secondary arm (5) extends inward towards the center stem (6) of the body. Each secondary arm (5) is slightly curved upward and features an upward curl (7) located at its extremity. The curl (7) acts as a retainer for garments and acts as a hook which can hold miscellaneous accessories placed on the secondary arm (5). A low-profile non-slip ridge (8) is located on the upper side of each secondary arm (5). The sharp edges of this ridge provide a sufficient grip to prevent garment slippage without damaging the material of garments. The secondary arm (5) is constructed with a moderate flex to gently squeeze and hold garments without damaging their material.

The modular high-capacity hanger body center stem (6) features a center opening (9) which reduces the weight of the body while providing a location where miscellaneous clothing items such as towels can be inserted. A locking hole (12) to receive a removable twist-on accessory hooks (30) is located above the center opening (9).

The lower part of the modular high-capacity hanger body (1) branches out into two rigid curved lower arms (10) extending outward with a slight downward slant. Each lower arm (10) features a low-profile non-slip ridge (8) on its upper side, as well as a cylindrical stop (11) with a locking hole (12) to accommodate a twist-on removable accessories hook (30). The profile of the lower arms (10) is designed to support the weight of heavy personal garments or accessories such as military bullet proof vests.

A robust lower hook (27) branches out of the base of a lower arm (10). The lower hook (27) can accommodate a variety of heavy items such as law enforcement weapon belts, tool belts as well as backpacks. A locking hole (12), located at the base of the lower hook (27) can receive a twist-on removable accessory hook (30). A locking eye (28) at the end of the lower hook (27) offers the option to secure valuable or restricted gear with an optional security locking cable (20) which can loop around a branch of the lower arm (10) and be locked.

The modular high-capacity hanger body (1) features four locking holes (12) dimensioned and shaped to receive and lock in four identical removable twist-on accessory hooks (30). One locking hole (12) is located on the upper part of the center stem (6). Two locking holes (12) are located at the end of each lower arm (10) of the hanger body (1). One locking hole (12) is located on the body (1) at the base of the lower hook (27). Each of the four twist-on removable accessory hooks (30) can mate with any of the locking holes (12) with a ¼ turn stem (31). Two small vertical spurs (32) positioned vertically at the end of the stem lock the hook in place once it is rotated 90° in a vertical position. A neoprene compressible "soft lock" O ring (16) is placed at the base of the accessory hook (30) stem (32) to provide friction for a secure fitting. The modular high-capacity hanger removable swivel handle (33) features an I-beam profile for light weight and rigidity. The ergonomic design of the handle grip (34) facilitates the handling of a fully loaded hanger. The handle grip (34) features a central circular depression (35) which keeps the loaded hanger centered when placed on a rod and eliminates lateral slippage when the modular high-capacity hanger is hanging from a rod during vehicle transportation such as in a boat. The stem (13) of the handle features a sturdy stainless-steel threaded handle insert (14) fastened to the stem (13) with a stainless spiral pin (15). A neoprene compressible "soft lock" O ring (16) is placed at the base of the threaded insert (14) to provide friction and prevent unwanted play as the handle (33) swivels. The threaded insert (14) of the handle (33) screws into a hex-nut (17) securely fitted in the hollow cavity (18) located in the upper center part of the hanger body (1). A locking eye (19) at the end of the handle (33) allows the use of an optional security locking cable (20) with one crimped loop at each end. This cable can be looped around a branch of the upper arms (2) and be secured with a lock.

Advantages of the Modular High-Capacity Hanger Over Existing Heavy-Duty Hangers

A single modular high-capacity hanger can replace several conventional heavy-duty hangers. Its unique design makes it possible to hang multiple garments and accessories in a minimum amount of space. One hanger can hold several pieces of heavy clothing as well as personal weapons or diving equipment and portable professional accessories.

Compact:

Unlike, existing heavy-duty hangers, the handle as well as the 4 accessory hooks can be removed from the modular high-capacity hanger body for easy storage in small spaces and in luggage.

Modular:

Unlike existing heavy-duty hangers, accessory hooks can be installed as needed in any of the modular high-capacity hanger body 4 locking holes.

Robust:

Unlike existing heavy-duty hangers made of ABS, the modular high-capacity hanger is made of 30% glass reinforced polyamide. This material offers high mechanical performance, even in extreme temperatures, as well as resistance to UV and to most chemicals.

Efficient:

Unlike existing heavy-duty hangers, the modular high-capacity hanger features 3 sets of arms plus removable features designed to facilitate organization and easy access to the items loaded.

The modular high-capacity hanger can hold the equivalent of several conventional heavy-duty hangers while taking no more space than one standard heavy-duty hanger.

Versatile:

The swivel handle allows hanging from any angle to increase the number of possibilities to hang the modular high-capacity hanger.

The accessory hooks can be installed in any of the modular high-capacity hanger locking holes.

Secure:

Multiple hooks, arm-stops and slippage protection features keep garments and accessories hung on the modular high-capacity hanger in place.

Locking eyes on the handle and on the lower arm offer additional theft protection.

Fabrication Process of the Modular High-Capacity Hanger

The modular high-capacity hanger and its accessories are injection molded. The handle components as well as the name plate, logo plate and hex nut. Are assembled manually.

The "soft lock" O ring (16) is installed manually on the stem (31) of the accessory hooks (30).

Methods of Use of the Modular High-Capacity Hanger

Assembly of the Modular High-Capacity Hanger Components:

The removable handle (33) of the modular high-capacity hanger screws on clockwise by hand to the top of the hanger body. The compressible "soft lock" neoprene O ring (16) located at the base of the handle insert (14) acts as a progressive brake and provides friction for the handle remain in position when it swivels.

The 4 twist-on accessory hooks (30) can be mounted and locked in any of the 4 locking holes (12) of the modular high-capacity hanger body. To lock a hook onto the hanger body, hold the hook horizontally to insert the stem and spurs (32) into the locking hole. Twist the hook so that the spurs lock vertically into the locking hole and the hook is facing up to hold a load. The compressible "soft lock" neoprene O ring (16) located at the base of the hook stem (31) provide friction to hold the hook in place.

Loading of the Modular High-Capacity Hanger:

First, swivel the handle (33) as needed to suspend the modular high-capacity hanger securely on a sturdy feature either longitudinally or laterally, on a rod, a shelve or any sturdy feature.

To facilitate access to all the items hung on the modular high-capacity hanger, it is recommended to load the hanger starting from the bottom.

Start by loading lower hook (27) first.

Load the lower arms (10).

Load the secondary arms (8).

Load the upper arms retaining slots (3) if desired.

Load the upper arms (2).

After the arms are loaded, place the accessory hooks (30) where needed on the modular high-capacity hanger body and hang accessories to allow easy retrieval. The accessory hooks can accommodate most items with straps, hooks or loops.

Tips:

One option to increase the modular high-capacity hanger capacity, is to insert sleeves or pant legs in the spaces above the secondary arms or the lower arms.

In addition to the removable accessory hooks, the curved ends of the secondary arms can be used to hold accessories with a strap, a hose or a hook.

Pant suspenders can be hung on any of the arms of the hanger.

Damp garments should be hung on separate arms to allow for adequate air flow for drying.

Users are encouraged to experiment with loading options and to devise their own original ways to take full advantage of their modular heavy-duty hanger.

The invention claimed is:

1. A multi-function hanger system, comprising:

A hanger body (1) comprising:

four locking holes (12);

a center part including a round flange (36), a hollow cavity (18), a hanger body stem (6), and a center part locking hole of the four locking holes (12);

a pair of upper arms (2), each upper arm of the pair of upper arms (2) extending laterally from an upper portion of the center part, each upper arm of the pair of upper arms (2) further including an arm slot (3) on a lower side thereof and two retaining spurs (4) of an upper side thereof:

a pair of secondary arms (5), each secondary arm of the pair of secondary arms (5) extending from a respective upper arm of the pair of upper arms (2), downward and inward toward the hanger body stem (6), wherein each secondary arm of the pair of the secondary arms (5) is designed with a moderate flex, and includes a low-profile non-slip ridge (8) located on an upper side thereof and an upward curl (7) located at the end thereof;

a pair of asymmetrical rigid lower arms (10) each asymmetrical lower arm of the pair of asymmetrical rigid lower arms (10) extending laterally and downward from a bottom of the hanger body stem (6), each asymmetrical rigid lower arm of the pair of asymmetrical rigid lower arms (10) further including another low-profile non-slip ridge (8) located on an upper side thereof and a cylindrical stop (11) with a lower arm locking hole (12) of the four locking holes located at an end thereof; and a rigid lower hook (27) capable of holding heavy loads, extending from a base of a rigid lower arm of the pair of asymmetrical rigid lower arms (10) wherein a locking eye (28) is located at an end of the rigid lower hook (27) and a lower hook locking hole (12) of the four locking holes is located at a base of the rigid lower hook (27);

a removable swivel handle (33) is mounted to an upper side of the hanger body (1) within a vertical hole (37) of the round flange (36);

a name plate (21) located on one side of the hollow cavity (18) of the hanger body (1) and a logo plate (24) located on an opposite side of said hollow cavity (18) of the hanger body (1); and a plurality of accessory hooks (30) wherein each of the four locking holes (12) comprising an accessory hook of the plurality of accessory hooks (30) detachably attached thereto, respectively.

2. The multi-function hanger system according to claim 1, wherein each of the plurality of accessory comprising:

a twist-on mount including a hook stem (31) with spurs (32); and a soft lock O-ring located on the hook stem (31).

3. The multi-function hanger system according to claim 1, wherein the removable swivel handle (33) further comprising a threaded handle insert (14) with a soft lock O-ring (16) wherein the threaded handle insert is configured to be screwed into a hex nut (17) securely fitted in the hollow cavity (18).

4. The multi-function hanger system according to claim 1, wherein the name plate (21) comprising four retainers (25) in order to hold a name tag (26); said name plate (21) being fastened to the logo plate by two screws (22) which are screwed into two stems (23) of the logo plate (24) respectively.

* * * * *